R. L. SKINNER.
LUBRICANT TRAP.
APPLICATION FILED NOV. 1, 1920.

1,435,561.

Patented Nov. 14, 1922.

Inventor
Ralph L. Skinner
By Norman T. Whitaker
his Attorney

Patented Nov. 14, 1922.

1,435,561

UNITED STATES PATENT OFFICE.

RALPH L. SKINNER, OF SACRAMENTO, CALIFORNIA.

LUBRICANT TRAP.

Application filed November 1, 1920. Serial No. 421,104.

*To all whom it may concern:*

Be it known that I, RALPH L. SKINNER, a citizen of the United States, and a resident of Sacramento, in the county of Sacramento and State of California, have invented a new and useful Lubricant Trap, of which the following is a specification.

My invention is a lubricant trap and has particular reference to the lubricant trap illustrated and described, but not claimed in my copending application entitled "Lubricant feed for internal combustion engines," Serial No. 421,105, filed November 1, 1920.

In addition to the generic objects set forth in the above mentioned application, it is the purpose of the present invention to provide a liquid trap wherein fluids of different specific gravity will be separated, the heavier fluid being trapped and at predetermined intervals allowed to flow to a reservoir while the lighter fluid is continuously fed to any suitable point.

The invention further provides a lubricant trap for use in internal combustion engines and includes a filter chamber and a float chamber, the former being adapted to have communication with the lubricant supply and the intake manifold of an internal combustion engine while the latter chamber is also adapted to have communication with the lubricant supply and is equipped with a float actuated mechanism controlling communication between the filter chamber and float chamber so that the lubricant upon reaching a predetermined height in the float chamber will operate the float operated mechanism to sever communication between the two chambers and at the same time permit the lubricant trapped in the float chamber to return to the lubricant pan.

With the preceding and other objects and advantages in mind, the invention consists in the novel combination of elements, construction and arrangement of parts and operations to be hereinafter more fully described, claimed and illustrated in the accompanying drawing, in which:

Figure 1:
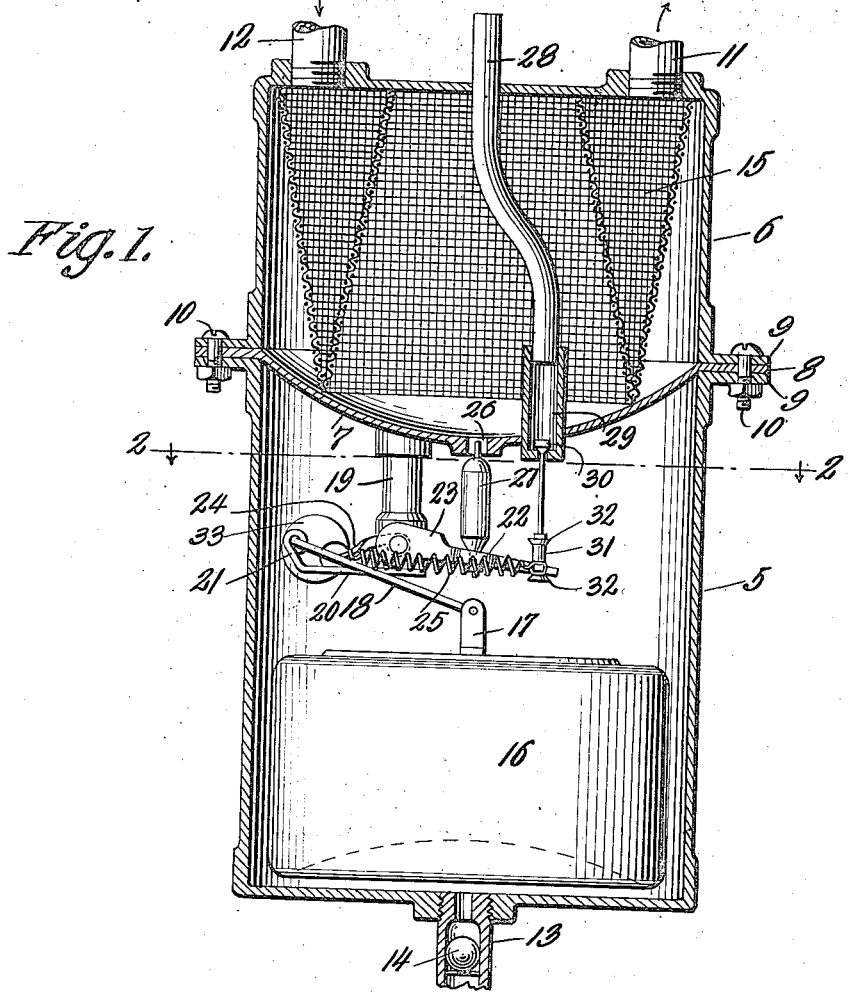
Figure 1 is a vertical sectional view of the device.
Figure 2:
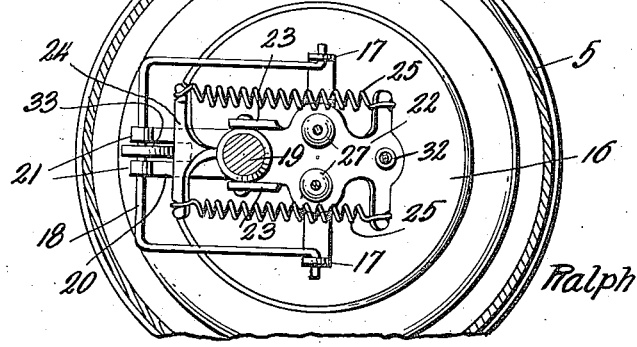
Figure 2 is a horizontal sectional view taken on line 2—2 of Figure 1.

The invention as reduced to practice consists of a float chamber 5 and a filter chamber 6, the latter being provided with a concave bottom or division wall 7 received in the upper end of the float chamber and formed with a circumferential flange 8 held between similar flanges 9 and the float and filter chambers respectively, these parts being secured together by bolts or other fastenings 10. Leading from the top of the filter chamber 6 is a pipe 11 adapted for connection with the intake manifold of an internal combustion engine (not shown) or other means of vacuum supply so that normally a vacuum will be produced in the filter and float chambers.

An inlet pipe 12 which may lead to the lubricant pan or have communication with the various cylinders of the engine at the sides thereof, as illustrated in my copending application above set forth, leads from the top of the filter chamber.

A drain pipe 13 leads from the bottom of the float chamber 5 and is adapted to have communication with the engine lubricant pan or casing (not shown). A ball valve 14 is arranged in this pipe 13 and is normally drawn up against its seat by the vacuum in the float chamber.

A double wall reticulated separator or filter 15 is mounted in the filter chamber 6 and its walls diverge toward the upper end thereof so that any mixture of lubricant and gaseous fuel which may have been drawn from the lubricant pan or the engine cylinders with the lubricant will be thoroughly filtered, and due to the fact that the lubricant is of greater specific gravity than the gaseous fuel the gaseous fuels will be drawn into the intake manifold (not shown) by way of the pipe 11.

A float 16 is mounted in the float chamber 5 and secured to the upper end thereof is a pair of upstanding ears or bearings 17 in which the extremities of a U-shaped bail or lever 18 are pivotally mounted. Depending from the bottom 7 is a post 19 or standard 19 from the lower end of which extends a horizontally disposed bracket 20 bifurcated at one end and terminating in upstanding bearings 21 in which the intermediate part of the U-shaped lever or bail 18 is pivotally mounted.

A normally horizontally disposed T-shaped lever is designated 22 and is provided with ears 23 at its inner end which are arranged upon opposite sides of the post 19 and pivotally secured thereto.

A second T-shaped lever 24 is pivoted in the lower end of the post 19 concentric with the pivotal mounting of lever 22 and extends in a direction the opposite of said lever.

Connecting the outstanding parts of the T-shaped levers 22 and 24 are contractile springs 25 which serve to swing these levers upwardly or downwardly as they pass by the pivot center.

The bottom of the filter chamber 6, that is the division wall 7, is provided with two openings or valve ports 26 having associated valves 27, the lower ends of which rest on and loosely engage the T-shaped lever 22 intermediate its ends.

Communicating with an air vent 28 extending up through the filter chamber 6 is a valve chamber 29 in which a valve 30 is slidable to open and close the valve port in its lower end.

The stem of this valve projects downwardly through the valve casing and is formed with an enlarged part 31 terminating in stops or abutments 32 at its opposite ends, the intermediate reduced portion of the part 31 passing loosely through a hole in the free end of the T-shaped lever 22.

Disposed between the bearings 21 of the bracket 20 and fixed to and rockable with the middle section of the bail or lever 18 is a notched disk 33 in which notch the free end of the T-shaped lever 24 resides.

In operation, the lubricant is drawn through the pipe 12 by the vacuum produced in the filter chamber and is discharged into the latter between the divergent walls of the filter 15.

The heavier products, such as lubricating oil, will gravitate to the bottom of the filter chamber and flow down into the float chamber through one of the two valve ports while the lighter products will be drawn upwardly into the intake manifold by way of the pipe 11.

Two openings or valve ports 26 are used to permit air to pass up through one while the oil flows down through the other which construction is particularly efficient if for any reason the valve 14 should leak some air.

Assuming the parts of the lubricant trap to be in the relative positions shown in Figure 1, but with the ball valve 14 drawn up against its seat by the vacuum in the chamber 5, the lubricant flowing into the chamber will cause the float 16 to rise which through the medium of the U-shaped lever or bail 18 will rotate the notched disk 33 and the latter in turn engaging the T-shaped lever 24 swings the same upwardly at an angle disposing the springs 25 at a point above the axis of both levers 22 and 24.

The contraction of these springs will cause the lever 22 to be also swung upwardly at an angle lifting the valve 30 from its seat to establish communication between the atmosphere and the float chamber 5 and the two valves 27 shall move simultaneously upwardly to closed position, thus cutting off the vacuum action on the float chamber 5, causing the dropping of the ball valve 14 to open position, and allowing the trapped lubricant to drain through the pipe 13, which action is facilitated by reason of the connection of such lower chamber with the outer air at this time.

When sufficient of the lubricant has thus been discharged to permit the float to descend sufficiently to cause the springs 25 to pass by the pivot center of the levers, such springs will contract and by rocking the levers to which they are attached, they will cause the opening of the two valve ports 26, 26 and the closing of the valve port with which the valve 30 is associated.

Another supply of lubricant will then be trapped in the chamber 5 and when sufficient thereof has been accumulated or stored, it will be delivered in the manner described above through the pipe 13.

It is to be noted that although the lubricant is discharged through the pipe 13 intermittently, this in no way interferes with the presence of the vacuum condition in the upper chamber 6.

It is to be understood that the form of my invention herein shown and described is to be taken as a preferred example of the same, and that various changes in the shape, size and arrangement of parts may be resorted to without departing from the spirit of the invention or the scope of the appended claims.

Having thus described my invention, what I claim as new and desire to secure and protect by Letters Patent of the United States, is:

1. A device of the character described comprising a casing having a plurality of inlet ports and further provided with a valve controlled outlet port, a pair of normally horizontally disposed levers disposed within the casing and having their inner ends pivoted, coil springs connecting the free ends of the levers together and normally disposed to one side of the pivot point of the levers, a plurality of valves operatively connected with one of the levers and controlling the inlet openings, the valves being so arranged with respect to each other as to close certain of the openings while the others are open, a float in the casing, and a rotatable element operated upon the ascent and descent of the float and adapted to engage the other of said levers to rock the same whereby to actuate the other lever to actuate the valves.

2. A device of the class described comprising a casing having a plurality of inlet openings, a pair of levers arranged in the casing and having their inner ends pivoted to swing about a horizontal axis, contractile springs connecting the free ends of the levers together and normally disposed to one side of the pivot point, a float in the casing, a bail pivotally connected with the float, a supported bracket having pivotal connection with one end of the bail, a notched disk fixed to rotate with said end of the bail and adapted to engage one of the levers to rock the same on its pivot and thereby change the relative position of the springs, and a plurality of valves operatively connected with one of the levers and controlling the openings, the valves being arranged so that certain of the same are open while the others are closed.

3. A device of the character described comprising a casing having inlet ports, a vertical post supported in the casing, a pair of T-shaped levers pivoted to the post, a plurality of valves operatively connected with one of the levers and controlling the inlet openings, the valves being so arranged as to close certain of the openings while the others are open, coil springs connecting the free ends of the T-shaped levers and disposed to one side of the pivot point of the same, an outstanding bracket carried by the post, a U-shaped bail journaled in the bracket, a trip element fixed to the latter adapted for engagement with the adjacent T-shaped lever, and a float in the casing and having operative connection with the extremities of the U-shaped bail.

4. A lubricant trap comprising in combination a closed casing having a division-wall defining upper and lower chambers therein and provided with a pair of valve-ports, said upper chamber being constructed to have connection with the lubricant supply of an internal-combustion engine and with a vacuum-producing means to create a vacuum in both chambers when said division-wall valve-ports are open, said lower chamber having a valve-port connected to the outer air, a vacuum-controlled discharge-valve to control the delivery of the oil from said lower chamber, a float in said lower chamber, and valves controlled by said float to close said division-wall valve-ports and open said outer-air valve-port when the float reaches a predetermined height and to open said division-wall ports and close said outer-air port upon descent of the float to a certain point, whereby the liquid in the lower chamber is discharged therefrom intermittently without substantial effect on the vacuum in the upper chamber.

5. A device of the character described comprising a float chamber and a filter chamber supported thereon, the bottom of the float chamber being provided with an outlet opening, the filter chamber being provided with inlet and outlet ports and also provided with an opening in its bottom, an air duct extending through the filter chamber, a reticulated filter element in said chamber, valves controlling the opening in the bottom of the filter chamber and the air duct, a pivoted element operatively connected with both valves and the second pivoted lever, contractile springs connecting the free ends of the levers, a float in the lubricant chamber and an element rotated by the rise and fall of the float and adapted to engage one of the levers whereby both levers will be swung to a position to simultaneously open one valve and close the other, and a check valve controlling the passage of lubricant from said chamber and normally seated to prevent the escape of lubricant.

6. A liquid separator and trap comprising a float chamber having a valve controlled outlet, a filter chamber supported thereon and having a port communicating with the float chamber, the filter chamber being also provided with a liquid inlet port and an outlet port communicating with a source of vacuum adapted to draw the lighter products from the filter chamber and also to normally retain the valve in the outlet in the float chamber in closed position, a reticulated filter disposed vertically in the filter chamber, an air duct communicating with the float chamber, a pair of normally horizontally disposed levers pivoted at a common point, a valve controlling the port in the filter chamber and loosely supported in one of said levers, a reciprocable valve controlling the air duct and having loose connection with said lever, a float in the float chamber, a horizontally disposed bracket supported to one side of one of the levers, a lever connected with the float and having one end pivotally connected with the bracket, and a notched disk fixed to rotate with the last mentioned lever adapted to engage the adjacent lever to rock the same on the rise and fall of the float, springs connecting the free ends of both levers adapted to rock the levers to simultaneously open one valve and close the other upon actuation of said lever by the notched disk, the valve in the outlet in the float chamber being returned to open position to permit the escape of the trapped liquid upon the moving of the valve controlling said port to closed position.

RALPH L. SKINNER.